United States Patent [19]

Macovski

[11] 4,293,871
[45] Oct. 6, 1981

[54] SOLID STATE COLOR TELEVISION CAMERA WITH MULTIPLE LINE READOUT

[76] Inventor: Albert Macovski, 2505 Alpine Rd., Menlo Park, Calif. 94025

[21] Appl. No.: 99,939

[22] Filed: Dec. 3, 1979

[51] Int. Cl.³ .............................................. H04N 9/07
[52] U.S. Cl. ..................................................... 358/44
[58] Field of Search ........................ 358/43, 44, 48, 49

[56] References Cited

U.S. PATENT DOCUMENTS

| 2,884,483 | 4/1959 | Ehrenhaft et al. | 358/44 |
| 4,117,510 | 9/1978 | Ohta et al. | 358/44 |
| 4,148,059 | 4/1979 | Dillon et al. | 358/37 |
| 4,245,241 | 1/1981 | Sato et al. | 358/44 |

FOREIGN PATENT DOCUMENTS 2905816  8/1979  Fed. Rep. of Germany ........ 358/44

*Primary Examiner*—John C. Martin

[57] ABSTRACT

A color image is imaged onto a single photosensitive array containing color filter material arranged in repetitive groups adjacent to the photosensitive elements. The information is stored and a plurality of lines in the array are read out simultaneously to provide all of the color information. In some embodiments the same lines are scanned every field since the chrominance information can have reduced resolution.

10 Claims, 7 Drawing Figures

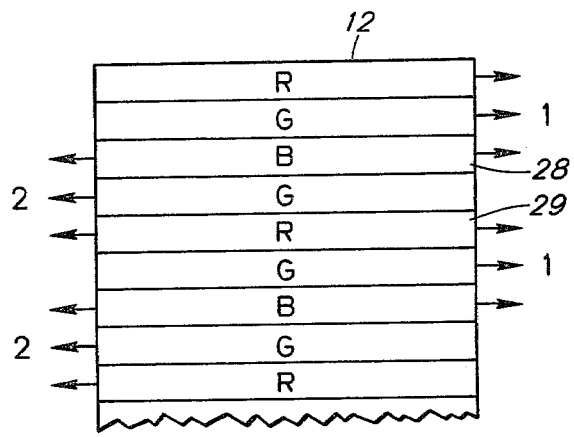
FIG. 3.
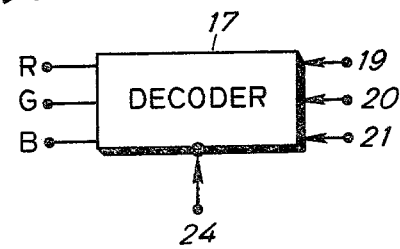
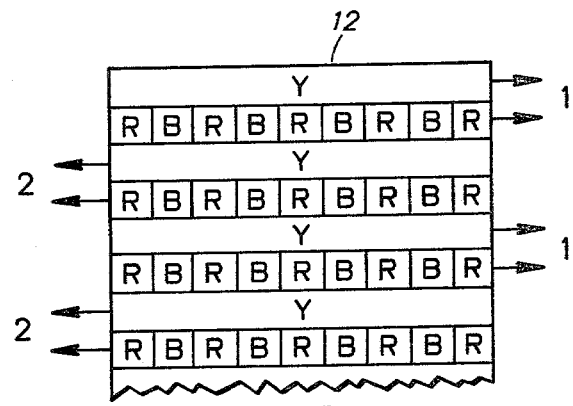
FIG. 4.
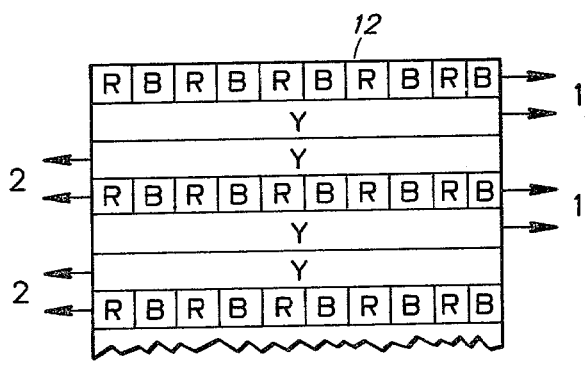
FIG. 5.
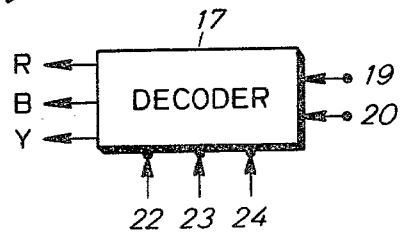

COMPENSATED Y
OUTPUT

SOLID STATE COLOR TELEVISION CAMERA WITH MULTIPLE LINE READOUT

BACKGROUND OF THE INVENTION

1. Field of the Invention

This invention relates to color television cameras using solid-state photosensitive arrays. In a primary application the invention relates to CCD color television cameras where a plurality of horizontal lines are read out simultaneously to provide the required color information.

2. Description of Prior Art

In recent years solid state color television cameras have begun to replace the cameras using one or more camera tubes. The advantages of the solid state cameras are numerous including small size, light weight, geometric accuracy and eventual reduced cost.

For the most part, the solid state camera systems have followed the general design of those using camera tubes. These systems can be separated into the categories of single-tube encoded color cameras, which are prevelant in the consumer market, and multiple tube color cameras, which are prevelant in the broadcast market. The single tube systems generally employ colored striped grating patterns for encoding the color information. Since these color carriers should not interfere with the luminance information, they generally are at relatively high spatial frequencies, making them difficult to resolve. The multiple tube color cameras generally employ complex optical systems for splitting the images into its component colors and imaging each color onto a different camera tube. These optical systems result in considerable light losses and registration problems. Hubrid systems have been used such as a two camera tube system with a luminance camera tube and an encoded-color camera tube.

Unfortunately solid state cameras, such as those using CCD's, have continued to use these same approaches. This is clearly set forth in a recent paper in the September, 1979 issue of *Electro-Optical Systems Design* by R. L. Rodgers III entitled, "Prototype CCD Color Television Camera." This paper explores the two systems. The single CCD color camera requires significant additional resolution to resolve the high frequency color gratings. These gratings must have a periodicity at the edge or beyond that of the luminance bandwidth to prevent interference with the luminance signal. On the other hand the multiple-device CCD system has a complex optical system with light loss and registration considerations. The geometric accuracy of the CCD's themselves minimizes the registration problem although the optical system continues to have significant registration problems. Also, the multiple device CCD systems have the obvious problem of high cost as do the very high-resolution single CCD devices. Another description of a system using three separate CCD camera devices is given in U.S. Pat. No. 4,007,488 issued to M. Morisheta, et al.

SUMMARY OF THE INVENTION

An object of this invention is to provide a low-cost, high-performance solid state color television camera.

It is also an object of this invention to provide a solid-state color television camera which has conventional horizontal resolution requirements.

It is a further object of this invention to provide a solid-state color television camera involving a single photosensitive array and a single imaging system to avoid registration considerations and light losses.

Briefly, in accordance with the invention, a colored scene is imaged onto an array of solid-state photosensitive detectors. Color filters, in groups of horizontal lines, are placed over the photosensitive elements. This information is transferred to storage devices. Groups of horizontal lines are read out simultaneously to provide all of the necessary color information. An anomorphic imaging systems can be used to simplify the use of additional horizontal lines. Also, a vertical aperture correction system can be used to minimize the resolution loss caused by overlap of adjacent scan lines.

BRIEF DESCRIPTION OF THE DRAWINGS

For a more complete disclosure of the invention, reference can be made to the following detailed description of several illustrative embodiments thereof which is given in conjunction with the accompanying drawings, of which:

FIG. 3 is a schematic representation of an embodiment of the color filters for a camera using twice as many array lines as active lines;

FIG. 4 is a schematic representation of an embodiment of the color filters for a camera using two array lines per active line;

FIG. 5 is a schematic representation of an embodiment of the color filters for a camera using 1.5 array lines per active line;

There is a significant need for a low-cost, lightweight color television camera for the home consumer market for use with either color television displays or video tape recorders. Over and above the home consumer, the educational and broadcast television system require lightweight television cameras. These are best provided by solid state arrays such as those using charged coupled devices (CCD's). Existing approaches, as indicated, either use multiple camera systems, with their attendant light loss and registration problems, or use color encoding stripes, with their attendant requirement for excessively high horizontal resolution.

Thus the existing solid-state camera approaches essentially use the same format as those of the camera tubes. However, camera tubes have a single readout electron beam which reads out a single line at a time. Solid-state systems, however, have arbitrary flexibility to read out a plurality of stored lines simultaneously.

Figure 1:
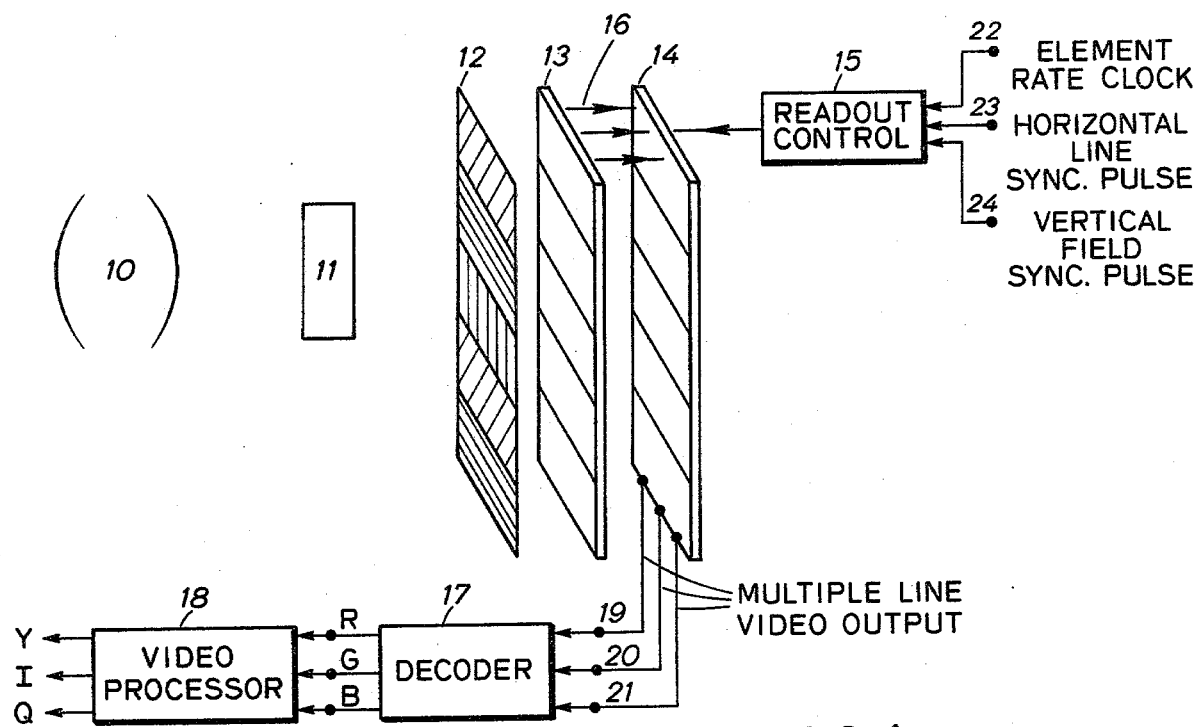
FIG. 1 is a schematic representation of the overall system using multiple-line readout.

The basic system is illustrated in FIG. 1. A scene 10 is imaged using optics 11 onto the camera. The camera consists of the array of lines of color filters 12, an array of lines of photosensitive devices 13 and a corresponding array of storage devices 14. The storage devices are connected to the corresponding photosensitive devices using connectors 16. These can be either physically along side the photosensitive devices or in an adjacent plane. The transfer from the photosensitive devices to the storage array is sometimes accomplished during the vertical blanking interval.

The light intensity information impinging through color filters 12 onto photosensitive element array 13 is thus stored in the storage array 14. The readout of the stored information is controlled by the readout control system 15. This readout of each line is accomplished in the conventional fashion. For example, using CCD devices, pulses driving each section are used to sequence the stored values of charge toward the output terminal where they are collected. This structure is described in a number of publications including: W. S. Boyle and G. E. Smith, "Charge Coupled Semiconductor Devices," *Bell System Technical Journal,* Vol. 49, p. 587, 1970; and D. F. Barbe, "Imaging Devices Using the Charge-Coupled Concept," *Proceedings of the IEEE,* Vol. 63, p. 38, 1975.

The readout control is driven by an element rate clock pulse 22 which controls the rate at which the element to element stored information of each horizontal line is read out. For the U.S. television standards this rate is approximately 6–8 MHz for systems having 300–400 picture elements per horizontal line. A horizontal line synchronizing pulse 23 is used to start the scan of each line or group of lines. In the U.S. standards this occurs at a rate of approximately 15,750 Hz. The vertical field sync pulse 24 is used to initiate the scan of each vertical field. Since the system uses line interlace, the readout must alternate between the readout of the array lines corresponding to the odd lines and the array lines corresponding to the even lines. In the U.S. standards these field pulses have a rate of approximately 60 Hz.

In this system, we have the combination of two unique and advantageous features. Firstly, the object is imaged onto a single photosensitive array 13 rather than three registered photosensitive arrays. Secondly, the number of elements per line is equal to that required for the desired luminance resolution, as in a black and white camera, without the excessive elements required to resolve a high frequency color encoding carrier. These significant advantages are made possible by the simultaneous readout of a plurality of stored lines. This readout is controlled in a prescribed manner by readout control 15. The specifics of that prescribed manner depends on the specific color filter used.

Thus a plurality of scanned signals 19,20 and 21 are produced representing the stored information from adjacent lines. These signals are then applied to decoder 17 where the signals are appropriately decoded into the primary color signals used in color television; red R, green G, and blue B. Again, the specifics of the decoding depends on the specific color filters used. For some applications, such as display on a color monitor, these color signals represent the desired signals. However, in other applications such as video tape recording or modulating a carrier to apply to a standard color television receiver, the desired signals are a wideband luminance signal Y and narrow band color-difference signals I and Q. These are derived from weighted sums of R,G, and B. Alternatively R-Y and B-Y can be used as narrowband color difference signals rather than I and Q. With some color filter arrangements, as will be shown, it becomes more convenient to decode the scanned signals; 19,20 and 21, directly into one or more of the desired signals rather than going through the intermediary of R,G and B. For example, the luminance signal Y can be created directly from the scanned signals in the decoder. Y, the luminance signal, is a weighted sum of R,G and B. A variety of weights, such as equal weighting, can be used. In the U.S. standards the weightings used are approximately 0.6G, 0.3R and 0.1B.

Figure 2:
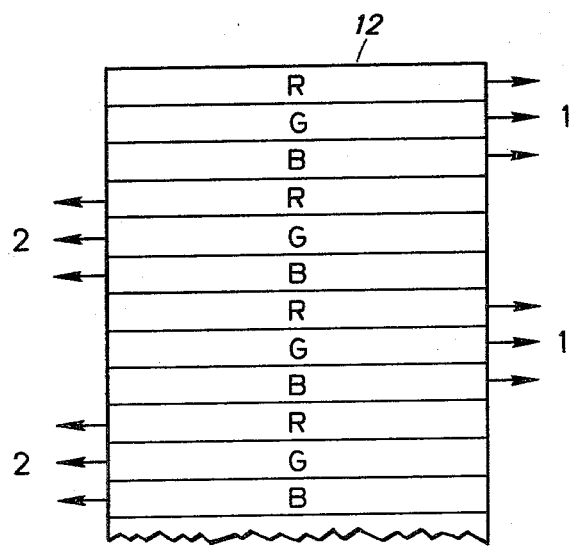
FIG. 2 is a schematic representation of an embodiment of the color filters for a camera using three array lines per active line.

A particular embodiment of color filters 12 is illustrated in FIG. 2. A partial illustration is used because of the large number of color lines in the filter. For explanation purposes, those lines used to create the odd fields have arrows to the right of the filter and are labeled "1." Conversely, those arrows used to create the even interlaced field have arrows to the left and are labeled "2." In this embodiment three photosensitive element lines are used for each active television line in the final resultant image. Therefore, as the first field is read out, the R,G and B filtered lines create scanned signals 19,20 and 21. After the odd field is read out the vertical field sync pulse causes the readout control system to begin reading out the even field, again consisting of trios of lines filtered by R,G and B.

Thus, in this embodiment, the scanned signals themselves 19,20 and 21 are already R,G and B and need not be decoded by decoder 17. They can be passed immediately to video processor 18. The color filters, however, need not necessarily be R,G and B. They can be any three primary colors which, if defined in the broadest sense, refer to any independent set of colors where no one color can be derived from the other two. Thus, if colors other then R,G and B are used, the decoder 17 is required to take weighted sums of the scanned signals to produce the R,G and B color display primary signals.

The total number of horizontal line intervals during a vertical field interval is 525. However, removing the 7% blanking interval, the total number of active lines is about 488 or about 244 per field. In building CCD devices this would represent the greatest number of lines required. Many systems compromise the vertical resolution somewhat and use fewer lines. In addition, camera systems can use a number of lines equal to the number of lines per field. These are then used to represent both the odd and even fields in an interlaced system. This compromises the vertical resolution and results in a simpler camera.

In the embodiment of FIG. 2, for full resolution, the number of lines of photosensitive elements in array 13 is three times the number of active lines per frame. This means that each photosensitive element will have the same width and be about one third the height of an equivalent element in a black and white array. Alternatively optical system 11 can be an anomorphic optical system which provides more magnification in the vertical direction than that of the horizontal. This allows each photosensitive element to have a more conventional size and thus be easier to construct. This anomorphic optical system can be used in any of the subsequent embodiments which have the number of lines of photosensitive elements greater than the number of active lines per frame.

The system of FIG. 1, using the color filters of FIG. 2, is a novel approach to fulfilling the stated requirements. The system provides full luminance resolution without requiring excess numbers of elements per line, and the resultant system is immune to registration errors, using a simple optical system. The system does, however, require excess numbers of horizontal lines of photosensitive elements. This problem is alleviated in the subsequent embodiments.

The embodiment using the color filters of FIG. 3 has a total number of photosensitive element array lines only twice that of the number of active lines. As is shown, the color green appears on every other line, in between the alternating red and blue filters. This embodiment makes some use of the difference between the requirement for luminance and chrominance resolution, which is fundamental to color television. Thus the chrominance resolution in the vertical direction is compromised somewhat. For example, as shown, the first readout line in both the odd and even fields derive their blue information from the same blue filter 28. Similarly the first readout line in the even field, and the second readout line in the odd field derive their red information from the same red filter 29. This is readily tolerated and will not significantly affect the final display.

The decoder 17 for this embodiment uses a vertical sync pulse 24 to switch the decoder on alternate fields. For example, on odd fields the scanned signals 19, 20 and 21 are connected, respectively, to the RGB outputs. On even fields the scanned signal outputs 19 and 21 are switched in decoder 17 so that the same output signals continue to represent R,G and B.

The luminance information, derived as a weighted sum of R,G and B will have some overlap from line to line. This should not cause any significant image deterioration, especially since the G signal is weighted most heavily. However, this overlap can be completely avoided if the G filter is replaced by a Y luminance filter. In that case the decoder can provide a luminance output directly from scanned signal 20. Outputs 19 and 21 will continue to be switched in decoder 17 to provide the R and B outputs for the video processor.

An alternate embodiment, which also provides twice as many array lines as active lines is shown in FIG. 4. In this embodiment we make use of the fact that the required horizontal chrominance resolution is less than that of the luminance resolution. As is shown, each alternate line contains a luminance color filter and two alternating color primaries such as the red and blue shown. As previously indicated the luminance color filter has a transmission representing a weighted sum of the primary colors. Using the U.S. standards the filter would be a yellowish green. However, equal weightings of the primaries can be used, in which case the luminance or Y filter would simply be transparent.

Since all of the luminance information comes from the Y filtered lines, the line containing the alternating color primaries can be relatively coarse, since only chrominance bandwidth is required. For example, using 0.5 MHz color bandwidth, which is used in many color television receivers, the total number of photosensitive elements in the alternating color primary line can be as low as 100. However, for higher color quality, numbers of elements up to three times this value would be used. In any case, the required number is less than that of the luminance resolution, so that excess resolution is not required.

In this embodiment only two scanned signals, 19 and 20, are required. Scanned signal 19, on each field, represents luminance and is thus directly connected to the output of decoder 17. Scanned signal 20 alternates between representing the two color primaries such as R and B. The decoder uses an alternating electronic switch to alternately connect the R and B outputs to signal 20. A horizontal line pulse 23 is used to start the switch in its correct initial position, in this case with the R output connected to signal 20. The element rate clock signal 22 is then used to sequence the switch on each element. This element rate clock can be different from the one used to scan the luminance lines, if different numbers of elements are used. It may prove most convenient to use the same number of elements on each line, with both being equal to that of the desired luminance resolution.

The R and B outputs will be in the form of square waves at a rate higher than the chrominance bandwidth. These square waves can be filtered at decoder 17 to provide the desired chrominance signal, with the square wave carrier removed. Alternatively, the filtering can take place in the video processor 18.

The embodiment of FIG. 4 did not make use of the reduced requirement for chrominance resolution in the vertical dimension. The system of FIG. 5 uses one chrominance line for every two luminance lines and thus has a total number of photosensitive array lines which is 1.5 times as great as the total number of active lines. As shown, on odd fields each upper luminance line is used with the chrominance line immediately above it. On even fields the lower luminance lines are used with the same chrominance lines which are immediately below. Thus each chrominance line is used with both the odd and even lines, reducing the chrominance resolution in the vertical dimension.

The decoding is similar to that of FIG. 4 except that a vertical sync pulse 24 is also needed to identify the odd and even fields. For example on the odd fields scanned signal 19 is the alternating primary signal and scanned signal 20 is the luminance signal. Thus 20 is connected to the Y output and 19 is switched between R and B using element clock 22 and horizontal sync pulse 23 as in the previous embodiment. Following the odd field, at the start of the even field, vertical sync pulse 24 results in switching scanned signal 19 to the Y output and alternating primary signal 20 is switched between R and B as previously described.

The geometry of FIG. 5, as shown, does not have each Y filter at its correct position in the image. This will probably not result in any discernible distortion. However, a space can be placed between the two adjacent Y lines to position them more accurately.

Figure 6:
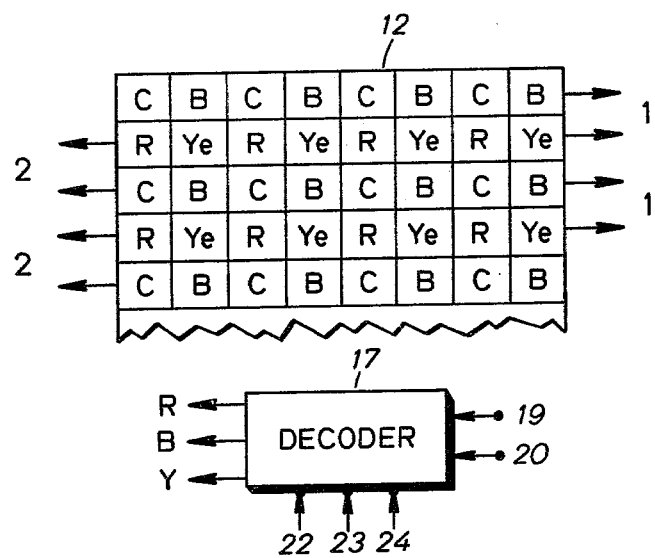
FIG. 6 is a schematic representation of an embodiment of the color filters for a camera where the number of array lines is equal to that of the number of active lines.

The embodiment of FIG. 6, using relatively complex color filters, is the most efficient of photosensitive array elements in that the number of array lines is equal to the number of active lines. The letter C refers to cyan and Ye refers to yellow in the color filters. Each vertical set of filters is arranged so that the sum corresponds to luminance. For example, cyan and red provide amounts of red, green and blue to represent a luminance signal. Also, the vertically alternate blue and yellow filters are designed to provide the same amounts of red, green and blue. The number of elements per line is equal to the desired luminance resolution, such as 300–400 elements. Thus, as each pair of lines is scanned, the sum of the scanned signals 19 and 20 provide a luminance signal since each element provides the sum of the upper and lower filters. When each pair of scanned lines 19 and 20 are summed, the average or sum of the array of filters is that of a luminance filter.

Decoder 17, on both odd and even fields, takes the sum of scanned signals 19 and 20 and applies it to the Y output terminal. The read and blue outputs are formed by gating the appropriate signals from 19 and 20 and applying them to the red and blue output terminals. On odd fields clock 23 is used to properly initiate each line with element clock 22 used to gate every other element of signals 19 and 20. On even fields vertical field pulse 24 is used to interchange scanned signals 19 and 20, with the same gating arrangement, to provide the R and B outputs.

This provides an exceptionally efficient embodiment having the conventional number of horizontal elements and vertical lines. A variety of color filters can be used as long as the sum of each line pair provides a luminance signal. For example, vertically adjacent elements, as in FIG. 6, can include any primary color and its complement. Thus magenta and green filters can be substituted for either the cyan-red or yellow-blue complementary combinations. A variety of chrominance decoding arrangements can be used since any three of the four filters of each set can be used to decode the three primary colors.

If the filters used are somewhat in error, white or neutral regions can produce different outputs on each alternate element when forming the Y signal by adding 19 and 20. Thus these grey or neutral regions will have a high frequency component since the sum of the resultant filtered C and R outputs does not equal the B and Ye outputs. A modulator can be added to the Y output to provide variable gain on each element. This modulator can be driven by a controlled square wave having a repetition rate of half the element rate. Thus the effective Y balance can be electrically controlled by forcing the Y output, in neutral regions, to be equal at every element.

Figure 7:
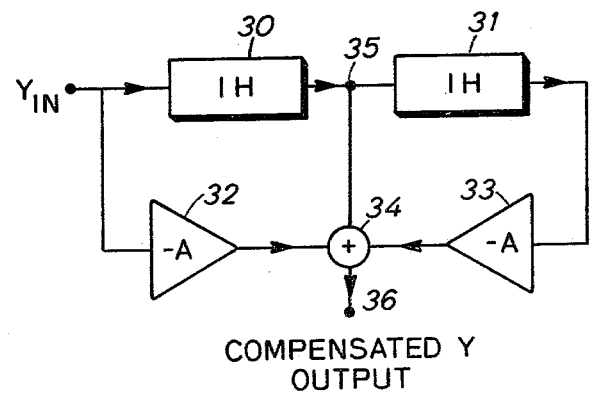
FIG. 7 is a schematic representation of a vertical aperture compensator for improving the vertical resolution.

In some embodiments, such as the one just described, there is overlap between adjacent vertical lines. Essentially, adjacent vertical lines share some of the same photosensitive elements. This can result in an effective loss of vertical resolution of the luminance information. This situation exists in the embodiments of FIGS. 3 and 6. To improve the vertical resolution a vertical aperture compensator can be used as shown in FIG. 7. Such compensators are presently used in many commercial television cameras. Information from adjacent scan lines is subtracted from the output line to shape vertical edges. As shown in FIG. 7 the Y signal is applied to delay lines 30 and 31 which delay the signal by the time of one horizontal line. The Y signal delayed by one line, 35, is used for the compensated Y output signal 36. The input and output of the two delay signals are given a negative gain of −A where A is less than one. These are added to the delayed Y signal 35 in adder 34 to provide the compensated Y output signal 36. In a simpler system with limited performance only delay element 30 is used with the subtraction taking place from only one adjacent line.

As indicated in the paper in *Electro-Optical Systems Design*, a camera can have a number of photosensitive array lines equal to the number of active field lines. Thus, on alternate fields, the same lines are repeated. These become interlaced at the receiver display. This halves the number of array lines at a compromise in vertical resolution. This concept can be used in those color filter embodiments where the odd fields and even fields are identical and non-overlapping. This would include those of FIGS. 2 and 4. In each of these embodiments the total array can consist of the odd or even fields only with the other deleted to halve the number of array lines. Thus the total number of horizontal lines of photosensitive elements is equal to the number of lines read out simultaneously times the number of active lines per television field.

What is claimed is:

1. Apparatus for providing standard color television signals from a scene comprising:
    an array of photosensitive elements arranged in horizontal lines;
    color filters covering the horizontal lines of photosensitive elements arranged in a vertical sequence consisting of three primary colors where one color is repeated every alternate horizontal line and the other two are each repeated every fourth horizontal line;
    means for imaging the scene, through the color filters, onto the array of photosensitive elements to provide stored information at each element;
    means for simultaneously reading out the stored information from three adjacent lines consisting of three different colors to provide scanned signals; and
    means for combining the scanned signals to provide the standard color television signals.

2. Apparatus as recited in claim 1 where green color filters are used every alternate horizontal line and red and blue are alternately used in the remaining horizontal lines.

3. Apparatus as recited in claim 1 where a luminance color filter is used every alternate horizontal line.

4. Apparatus for providing standard color television signals from a scene comprising:
    an array of photosensitive elements arranged in horizontal lines;
    color filters covering the horizontal lines of photosensitive elements wherein each alternate line is filtered with a first repetitive alternating element pattern of two colors and the remaining lines are filtered with a second repetitive alternating element pattern of two different colors
    means for imaging the scene, through the color filters, onto the array of photosensitive elements to provide stored information at each element
    means for simultaneously reading out the lines containing the first and second repetitive alternating patterns to provide scanned signals;
    modulator means for sequentially varying the gain of the scanned signals of alternate elements whereby color errors can be corrected; and
    means for combining the scanned signals to provide the standard color television signals.

5. Apparatus as recited in claim 4 wherein the vertically adjacent color filters of the alternate lines and the remaining alternate lines have a combined transmission which provides the luminance information.

6. Apparatus as recited in claim 5 wherein the repetitive alternating pattern of each alternate line includes color filters which are complementary to the corresponding color filters of the remaining alternate lines.

7. Apparatus as recited in claims 1 or 4 where the means for combining the scanned signals includes means for producing a luminance signal and where the luminance signal is filtered by a vertical aperture compensator where the luminance signal from an adjacent horizontal line is subtracted from the filtered luminance signal.

8. Apparatus for providing standard color television signals from a scene comprising:
    an array of photosensitive elements arranged in horizontal lines;
    color filters covering the horizontal lines of photosensitive elements wherein the color filters are arranged vertically in alternating groups of three lines where each group includes identical uniform color filters on two lines and one repetitive alternating pattern of color filters on the remaining line;

means for imaging the scene, through the color filters, onto the array of photosensitive elements to provide stored information at each element;

means for simultaneously reading out a line containing a uniform color filter and an adjacent line containing a repetitive alternating pattern of color filters to provide scanned signals;

means for combining the scanned signals to provide the standard color television signals.

9. Apparatus as recited in claim 8 where the uniform color filter is a luminance filter and the repetitive alternating pattern of color filters are two different primary colors.

10. Apparatus as recited in claims 1 or 8 where the means for imaging the scene onto the array of photosensitive elements is an anomorphic imaging system where the vertical size of the image, normal to the direction of the horizontal lines, is magnified by an amount greater than the horizontal magnification of the image.

* * * * *